US012722983B2

(12) United States Patent
Von Deak et al.

(10) Patent No.: US 12,722,983 B2
(45) Date of Patent: Sep. 1, 2026

(54) ACID TREATMENT OF $LiNiO_2$ TO DECREASE GAMMA-NIOOH FORMATION

(71) Applicant: BASF Corporation, Florham Park, NJ (US)

(72) Inventors: Dieter G. Von Deak, Solon, OH (US); Tinoush Dinn, Beachwood, OH (US); William C. Mays, Farmington Hills, MI (US); Martin Lawrence Panchula, Eastlake, OH (US)

(73) Assignee: BASF CORPORATION, Florham Park, NJ (US)

( * ) Notice: Subject to any disclaimer, the term of this patent is extended or adjusted under 35 U.S.C. 154(b) by 468 days.

(21) Appl. No.: 18/396,373

(22) Filed: Dec. 26, 2023

(65) Prior Publication Data

US 2024/0217840 A1 Jul. 4, 2024

Related U.S. Application Data

(60) Provisional application No. 63/477,679, filed on Dec. 29, 2022.

(51) Int. Cl.
*C01G 53/00* (2025.01)
*C01G 53/42* (2025.01)

(52) U.S. Cl.
CPC .......... *C01G 53/42* (2013.01); *C01P 2002/72* (2013.01); *C01P 2006/11* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 8,703,336 B2 | 4/2014 | Richards et al. | |
| 2021/0324495 A1* | 10/2021 | Rohde | C22B 1/005 |

FOREIGN PATENT DOCUMENTS

| | | |
|---|---|---|
| CN | 104205433 A | 12/2014 |
| EP | 3 621 923 B1 | 3/2021 |
| WO | 2013/142635 A1 | 9/2013 |
| WO | 2021/183094 A1 | 9/2021 |
| WO | 2022/147252 A1 | 7/2022 |

OTHER PUBLICATIONS

Dean, J. R., "Inductively Coupled Plasma-Atomic Emission Spectroscopy," *Practical Inductively Coupled Plasma Spectroscopy*, 2005, pp. 65-87.

Welz, B. et al., "The Individual Steps of an Analytical Method," *Atomic Absorption Spectrometry*, 3rd ed., 1999, pp. 221-294.

(Continued)

*Primary Examiner* — Stefanie J Cohen
(74) *Attorney, Agent, or Firm* — Peter T. DiMauro

(57) ABSTRACT

Disclosed is a process for producing a battery material including contacting a first intermediate product of a battery material with an acidic medium under conditions sufficient to dissolve low-lithium-containing oxide present on a surface of the first intermediate product to obtain a second intermediate product such that a weight of the second intermediate product is 0.2% to 5% less than a weight of the first intermediate product.

19 Claims, 1 Drawing Sheet

(56) References Cited

OTHER PUBLICATIONS

Arai, H. et al., “Synthesis and electrode performance of layered nickel dioxide containing alkaline ions,” *Electrochimica Acta*, 2005, vol. 50, Issue 9, pp. 1821-1828.

Aleksandrova, Irina, et al., “Protonation of $Li_x(Co, Ni, Mn)O_2$ compounds in acidic conditions”, *Journal of Solid State Chemistry*, vol. 289, Jun. 6, 2020, XP086237790.

* cited by examiner

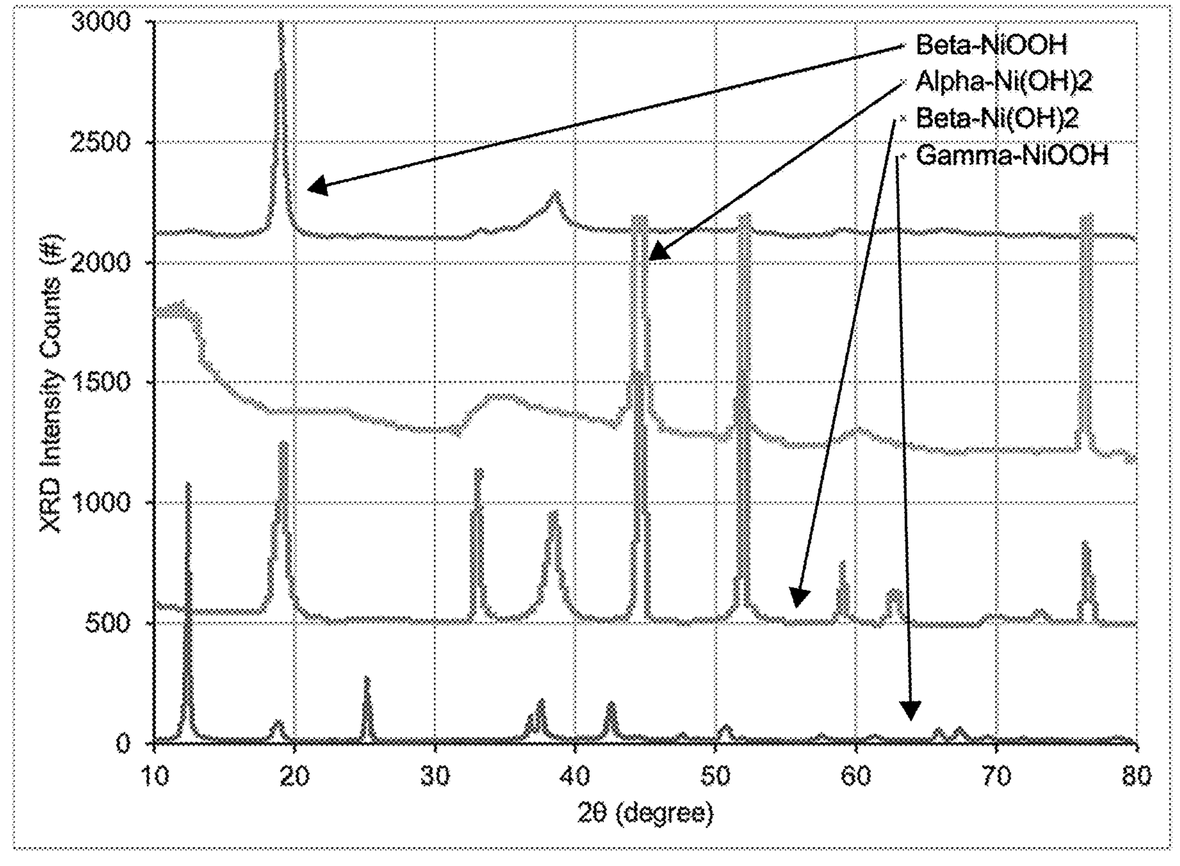
Beta-NiOOH
Alpha-Ni(OH)2
Beta-Ni(OH)2
Gamma-NiOOH
XRD Intensity Counts (#)
2θ (degree)
3000
2500
2000
1500
1000
500
0
10
20
30
40
50
60
70
80

ACID TREATMENT OF $LiNiO_2$ TO DECREASE GAMMA-NIOOH FORMATION

TECHNICAL FIELD

The disclosure relates to processes for improving the quality of an intermediate product in battery material production. More specifically, the disclosure relates to processes for treating a delithiated lithium nickel oxide (DLNO) material obtained from delithiation of a lithium nickel oxide (e.g. $LiNiO_2$) material with an acid treatment to reduce the formation of γ-NiOOH in the caustic treated stabilized battery material.

BACKGROUND

Lithium-ion batteries are increasingly used in essential applications such as powering electric vehicles, cellular telephones, and cameras. The formation of electrochemically active compositions for use in batteries typically involves two primary steps. First, a precursor can be formed by such as by co-precipitation reactions whereby transition metals are intermixed in the form of hydroxides or carbonates to form a precursor powder. This precursor can then be mixed with a lithium compound and calcined under high temperature to form an electrochemically active composition. During formation of a charged state of the cathode material according to traditional processes, the material is subjected to delithiation to remove the lithium while maintaining the crystal arrangement of the other elements in the material. This allows the resulting delithiated material to be incorporated into "charged" electrochemical cells as a cathode electrochemically active composition.

Prior processes for achieving this delithiation of the electrochemically active compositions suffered several drawbacks, such as undesirably high amounts of γ-NiOOH phase in the battery material. The γ-NiOOH phase can undesirably form on the surface of a delithiated electrochemically active composition upon contact with an alkaline solution typically found in electrolytes used in battery manufacture. As excessive γ-NiOOH phase reduces the battery quality, there is a need to develop techniques to reduce the formation of γ-NiOOH phase on delithiated electrochemically active compositions.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

In one or more embodiments, a process for producing a battery material can include contacting a first intermediate product of a battery material with an acidic medium under conditions sufficient to dissolve low-lithium-containing oxide present on a surface of the first intermediate product to obtain a second intermediate product, wherein a weight of the second intermediate product can be from about 0.2% to about 5% less than a weight of the first intermediate product, and wherein the first intermediate product can include $Li_xNi_zO_2$, wherein x ranges from about 0 to about 0.2 and z ranges from about 0.1 to about 1.

BRIEF DESCRIPTION OF THE DRAWINGS

FIG. 1 shows a graph of an XRD analysis of various structures of nickel hydroxide.

DETAILED DESCRIPTION

It is to be understood that the following disclosure describes several exemplary embodiments for implementing different features, structures, and/or functions of the invention. Exemplary embodiments of components, arrangement, and configurations are described below to simplify the present disclosure, however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments can be used in any other exemplary embodiments, without departing from the scope of the disclosure.

The present disclosure is directed to processes for treating delithiated electrochemically active compositions to reduce the formation of γ-NiOOH. These delithiated electrochemically active compositions can include intermediate products of material suitable for use as battery material in an electrochemical cell, such as one or more cells within a primary or secondary battery. Provided are cost effective processes for treating delithiated electrochemically active compositions to reduce the formation of γ-NiOOH.

Gamma phase (γ-NiOOH) is one of four nickel hydroxide structures. In Ni(II), aging of α-$Ni(OH)_2$ forms β-$Ni(OH)_2$. In Ni(III), aging of β-NiOOH forms γ-NiOOH. As shown in FIG. 1, when measured by X-ray diffraction (XRD), γ-NiOOH exhibits an XRD peak intensity at 2θ of about 12.5°. The relative amount of γ-NiOOH can be estimated by evaluating the XRD peak intensity at 2θ of about 12.5°.

While not wishing to be bound by theory, it is believed that a low-lithium-containing oxide present on a surface of the first intermediate product can contribute to the formation of γ-NiOOH on the battery material. Generally, a low-lithium-containing oxide can contain Li at an atomic percentage (at %) relative to the total metals in the electrochemically active composition of about 0.1 at % or less. This disclosure provides processes for producing a battery material including acid treatment to reduce the amount of γ-NiOOH in a battery material that include removing low-lithium-containing oxide from an intermediate product thereof.

In one or more embodiments, the generation of battery material can begin with calcination of a lithium compound and a transition metal compound, a rare earth element compound, or combinations thereof. The lithium compound can be lithium hydroxide and the transition metal compound can be Ni, resulting in "LNO" (Lithium nickel oxide) as a material precursor of the battery material.

As used herein, the term "lithium compound" refers to a lithium containing composition in the form of a lithium hydroxide, lithium oxide, lithium carbonate, lithium nitrate, lithium sulfate, lithium acetate, lithium peroxide, lithium hydrogen carbonate, or a lithium halide.

As used herein, the term "calcination" refers to a thermal treatment in the presence of an oxidizing atmosphere so as to cause a chemical transformation of a material.

As used herein, the term "electrochemically active composition" refers to an active battery material precursor that has been subjected to calcination. Illustrative examples of transition metal oxide electrochemically active compositions can include, but are not limited to, chemistries based on LiNiMO where M is optional in the material and can be any transition metal, rare earth element, or combinations thereof.

As used herein, the term "delithiated electrochemically active composition" refers to an electrochemically active composition that has been subjected to a delithiation process. An example of a delithiated electrochemically active composition can include a delithiated $LiNiO_2$, which is also referred to herein as "DLNO".

A "delithiation process" can include a process which decreases the lithium atomic percent (at %) on a metals basis. In one or more examples, the delithiation process can be a Ca/Na/Li hypochlorite delithiation process. One or more exemplary delithiation techniques are disclosed in WO2021183094, which is incorporated herein by reference in its entirety.

A process for removing lithium from an electrochemically active composition can include providing an electrochemically active composition, combining the electrochemically active composition with a strong oxidizer or acid wash for a lithium removal time, and thereby forming a delithiated electrochemically active composition. Briefly, a delithiation process can include combining an electrochemically active composition such as one defined by the formula of $LiNiMO_2$, with a strong oxidizer for a lithium removal time, wherein the lithium removal time is such that a Li/Ni at % ratio following the lithium removal time is less than the initial Li/Ni at % ratio, thereby forming a delithiated electrochemically active composition. A strong oxidizer can include one or more of a hypochlorite sat, chlorite salt, chlorate salt, perchlorate salt, hydrogen peroxide, chlorine, hypochlorous acid, or ozone.

The delithiated electrochemically active composition after being subjected to a delithiation process or processes can include those compositions falling under the formula $Li_xNi_zMO_2$ where x is the atomic ratio of Li and can range from about 0 to about 0.2, and z is the atomic ratio of Ni and can range from about 0.1 to about 1 and M is optional and can be one or more of Co, Mn, Al, Mg, Ti, Zr, Nb, Hf, V, Cr, Sn, Cu, Mo, W, Fe, Si, Zn, B, other transition metals, a rare earth element, or combinations thereof. In some examples, M can be or include 1, 2, 3, 4, 5 or more of the foregoing list.

An atomic ratio can be measured by any process known in the art. An example can include inductively coupled plasma atomic emission spectroscopy (ICP) or atomic absorption spectroscopy as described by J. R. Dean (Practical Inductively Coupled Plasma Spectroscopy, Chichester, England: Wiley, 2005, 65-87) and Welz and Sperling (Atomic Absorption Spectrometry, 3rd ed., Weinheim, Germany: Wiley VCH, 1999, 221-294). The chemical composition of compositions can be examined by a Varian Liberty 100 inductively-coupled plasma (ICP) system.

The delithiated electrochemically active composition can include Ni and one or more additives. The delithiated electrochemically active composition can include Ni at an atomic percentage (at %) relative to the total metals in the electrochemically active composition of about 10 at % or greater, optionally 20 at % or greater, optionally 30 at % or greater, optionally 40 at % or greater, optionally 50 at % or greater, optionally 60 at % or greater, optionally 70 at % or greater, optionally 80 at % or greater, optionally 90 at % or greater, optionally 95 at % or greater, optionally 96 at % or greater, optionally 97 at % or greater, optionally 98 at % or greater, optionally 99 at % or greater, optionally 100 at %. Optionally, the atomic percentage of Ni can be from about 70 at % to 99 at % or greater. Optionally, the atomic percentage of Ni can be from 80 at % to 99 at % or greater. Optionally, the atomic percentage of Ni can be from about 90 at % to 99 at % or greater. Optionally, Ni can be the only transition metal designed in or present in the material such that Ni can be present at substantially 100 at %.

A delithiated electrochemically active composition can include Ni and one or more other transition metals. One or more other transition metals (other than Ni) can each be individually present at about 0 at % to 5 at %. Optionally, one or more other transition metals can each individually be present at about 0.1 at % to 4.5 at %, optionally 0.5 at % to 4. at %. Optionally, 1, 2, 3, or more other transition metals other than Ni can be present in a delithiated electrochemically active composition.

A delithiated electrochemically active composition, such as DLNO, has a particle size. Particle size is defined as Dv50, which is the diameter of the particle such that about 50% of a sample's mass is smaller than and about 50% of a sample's mass is larger than the Dv50, assuming particle density is uniform and not a function of size. Optionally, a particle size can be from about 1 μm to about 20 μm or any value or range therebetween. Optionally, a particle size is about 1-15 μm, optionally 1-10 μm, optionally 1-7 μm, optionally 4-7 μm, optionally 4-6 μm. Particle size can be measured by techniques known in the art, for example, laser diffraction particle size analysis. Laser diffraction particle size analysis can measure particle size distributions by measuring the angular variation in intensity of light scattered as a laser beam passes through a dispersed particulate sample. Large particles scatter light at small angles relative to the laser beam and small particles scatter light at large angles. The angular scattering intensity data can then be analyzed to calculate the size of the particles responsible for creating the scattering pattern, using the Mie theory of light scattering. The particle size can be reported as a volume equivalent sphere diameter.

Oftentimes, a delithiated electrochemically active composition that has been subjected to delithiation, such as DLNO, can be too chemically reactive for direct use as a battery material in battery cells. Therefore, the electrochemically active composition can be subjected to stabilization treatment.

Referring to LNO as an exemplary active material precursor of such stabilization treatment, LNO can be treated with an aqueous oxidation process which causes the Ni(III) to partially oxidize to Ni(IV) and substantially delithiates the LNO, thereby forming DLNO (delithiated nickel oxide) as a first intermediate product. To stabilize the intermediate product for direct use in battery cells, the intermediate product can be partially stabilized (reduced) by exposing the intermediate product to OH and/or KOH, thereby forming potassium stabilized delithiated nickel oxide ("KDLNO"). KDLNO is sufficiently stable and suitable for use as a battery material.

The sequence and approximate chemical formulas of the material in the various stages are shown below:

LNO—$LiNi_zO_2$ (Nickel oxidation state is from about 2.9 to 3.0)

DLNO—$Li_xNi_zO_2$ (Nickel oxidation state is from about 3.7 to 4.0)

KDLNO—$K_yLi_xNi_zO_2$ (Nickel oxidation state is from about 3.5 to 4.0);

wherein y can range from about 0 to 0.3, x can range from about 0 to 0.2, z can range from about 0.1 to 1, and x+y can range from about 0 to 0.5.

It can be advantageous to prepare the battery material in a manner that reduces the formation of γ-NiOOH in the battery material, such as by pre-treating the delithiated nickel oxide before conversion of the delithiated nickel oxide to potassium stabilized delithiated nickel oxide.

In one or more examples, a process for producing a battery material, the process can include contacting a first intermediate product of a battery material with an acidic medium under conditions sufficient to dissolve low-lithium-containing oxide present on a surface of the first intermediate product to obtain a second intermediate product, where a weight of the second intermediate product is 0.2% to 5% less than a weight of the first intermediate product, and where the first intermediate product is $Li_xNi_zO_2$, wherein x ranges from 0 to 0.2 and z ranges from 0.1 to 1.

The first intermediate product can be $Li_xNi_zO_2$, which is a delithiated nickel oxide, where x can range from about 0 to 0.2 and z can range from about 0.1 to 1. In one or more examples, x can be 0.02 or more, 0.03 or more, 0.04 or more, or 0.05 or more. In one or more examples, x can be 0.2 or less, 0.15 or less, 0.1 or less or 0.07 or less. In one or more examples, z can be 0.1 or more, 0.15 or more, 0.2 or more, 0.25 or more, or 0.3 or more. In one or more examples, z can be 1 or less, 0.9 or less, 0.8 or less, 0.7 or less, or 0.5 or less. In some examples, the first intermediate product can be $Li_xNi_zMO_2$, where M is one or more of Co, Mn, Al, Mg, Ti, Zr, Nb, Hf, V, Cr, Sn, Cu, Mo, W, Fe, Si, Zn, B, or a rare earth element.

The first intermediate product can be separated from an aqueous slurry prior to the contacting step. In some examples, the aqueous slurry can be a mother liquor including the first intermediate product and an acidic solution obtained from a delithiation process. Suitable techniques for separating solids from an aqueous slurry, such as filtration, are well known in the art.

In the step of contacting the first intermediate product of a battery material with an acidic medium, the acidic medium is not particularly limited and can include at least one of HCl, $H_2SO_4$, nitric acid, acetic acid, phosphoric acid, hydrobromic acid, hydroiodic acid, perchloric acid, chloric acid, or a combination thereof.

In the step of contacting the first intermediate product of a battery material with an acidic medium under conditions sufficient to dissolve low-lithium-containing oxide present on a surface of the first intermediate product to obtain a second intermediate product, the conditions can include the ratio of mol H+/mol of the first intermediate product, a time of treatment, and temperature. Generally, a higher ratio of mol H+/mol of the first intermediate product or higher temperature can increase the rate of reaction, thereby reducing the amount of reaction time. Conversely, conditions including a comparatively lower ratio of the mol H+/mol of the first intermediate product or lower temperature can result in a slower reaction that requires a longer reaction time.

In the step of contacting the first intermediate product of a battery material with an acidic medium under conditions sufficient to dissolve low-lithium-containing oxide present on a surface of the first intermediate product to obtain a second intermediate product, the conditions can include a ratio of mol H+/mol of the first intermediate product of from about 0.025 to 0.2. For example, the acidic medium can include a ratio of mol H+/mol of the first intermediate product of about 0.025 or more, 0.05 or more, 0.075 or more, or 0.1 or more. Additionally, the acidic medium can include a ratio of mol H+/mol of the first intermediate product of about 0.2 or less, 0.175 or less, 0.15 or less, or 0.1 or less.

In the step of contacting the first intermediate product of a battery material with an acidic medium under conditions sufficient to dissolve low-lithium-containing oxide present on a surface of the first intermediate product to obtain a second intermediate product, the conditions can include a treatment time of about 3 hours or more. The treatment time can be about 3 hours or less, 2 hours or less, 1.5 hours or less, 1 hour or less, or 30 minutes or less.

In the step of contacting the first intermediate product of a battery material with an acidic medium under conditions sufficient to dissolve low-lithium-containing oxide present on a surface of the first intermediate product to obtain a second intermediate product, the conditions can include a temperature between from about 20° C. and 150° C. For example, the contacting temperature can be about 20° C. or more, 25° C. or more, 30° C. or more, 35° C. or more, 40° C. or more, 50° C. or more or 60° C. or more. Additionally, the contacting temperature can be about 150° C. or less, 125° C. or less, 100° C. or less, 90° C. or less, 85° C. or less, 80° C. or less, or 75° C. or less.

Contacting the first intermediate product of a battery material with an acidic medium under conditions sufficient to dissolve low-lithium-containing oxide present on a surface of the first intermediate product to obtain a second intermediate product causes a weight of the second intermediate product to be less than an initial weight of the first intermediate product proportional to the amount of material dissolved from the surface of the intermediate product. The amount of weight loss can be controlled to balance yield loss against removal of a sufficient amount of low-lithium-containing oxide to reduce formation of gamma-NiOOH. A weight of the second intermediate product can be from about 0.2% to about 5% less than a weight of the first intermediate product. A weight of the second intermediate product can be about 5% less, 4.5% less, 4% less, 3.5% less, 3% less, 2.5% less, 2% less, or 1.5% less than a weight of the first intermediate product. Removal of low-lithium-containing oxide can be sufficient if a weight of the second intermediate product is at least 0.2% less than, at least 0.3% less than, at least 0.4% less than, at least 0.5% less than or at least 1% less than a weight of the first intermediate product.

In some examples, after contacting a first intermediate product of a battery material with an acidic medium to obtain a second intermediate product, the second intermediate product can be contacted with an aqueous medium including a Bronsted base, optionally selected from Ba(OH)2, Ni(OH)2, CsOH, Sr(OH)2, RbOH, NaOH, LiGH, KOH, $Ca(OH)_2$, or $Mg(OH)_2$, or a combination thereof, to obtain a stabilized slurry containing solids of the battery material and filtrate liquid. In one or more examples, conversion of the DLNO into KDLNO can be accomplished by reacting the washed intermediate product with KOH following the methods of H. Arai et al. (Electrochimica Acta 50 (2005) 1821-1828), incorporated herein by reference, and resulting in crystal structures described in EP 3 621 923 B1, incorporated herein by reference.

The solids obtained from filtering the stabilized slurry to separate the solids from the filtrate liquid, can be obtained as a filtered cake. The filtered cake can be used as battery material without washing. Alternatively, the filtered cake can be washed with water, slightly acidified water, or slightly caustic water.

Advantageously, the amount of γ-NiOOH in the solids obtained from methods of this disclosure after stabilization is low, thereby improving the quality of the KLDNO in use as a battery material. The amount of γ-NiOOH in the solids after stabilization can be measured by X-ray diffraction (XRD). In particular, the relative improvement in the amount of γ-NiOOH is estimated by determining a ratio of an X-ray diffraction (XRD) peak intensity at 2θ of about 12.5° and an XRD peak intensity at 2θ of about 37.3°.

In X-ray diffraction analysis, an X-ray beam diffracts a statistical distribution of crystallites while data is collected by a single-axis goniometer. Suitable techniques for measuring the x-ray diffraction peak intensity include powder x-ray diffraction analysis (pXRD), such as Cu-Kα powder x-ray diffraction analysis. pXRD is an analytical technique used to characterize the crystal lattice structure of a sample material, such as a crystalline powder. XRD analysis of a crystalline sample material results in a characteristic diffraction pattern consisting of peaks of varying intensities, widths, and diffraction angles (peak positions) corresponding to diffraction planes in the crystal structure of the sample material. XRD patterns can be measured with an X-ray diffractometer using CuKα radiation by standard processes described, for example, by B. D. Cullity and S. R. Stock, Element of X-ray Diffraction ($3^{rd}$ ed. 2001). A D-8 Advanced X-ray diffractometer, available from Bruker Corporation (Madison, Wisconsin, USA), can be used to complete powder CRD analysis on a sample material such as a non-stoichiometric KDLNO delithiated layered nickel oxide. The normalized intensity, along with peak position, can be used to compare the relative efficiency of diffraction associated with certain diffraction planes with the crystal lattice of a sample material. The resulting XRD pattern can be compared with known XRD patterns. Comparative XRD patterns can be generated from known pure or mixed sample materials. In addition, the resulting XRD pattern can be compared with known XRD patterns with, for example, the Powder Diffraction File (PDF) database, available from the International Centre for Diffraction Data (Newton Square, Pa. USA, or the Inorganic Crystal Structure Database (ICSD), available from FIZ Karlsruhe (Eggenstein-Leopoldshafen, Germany).

The battery material after stabilization can have a ratio of a first x-ray diffraction peak intensity at a 2θ of about 12.5° and a second x-ray diffraction peak intensity at a 2θ of about 37.3° of 50% or less. The battery material can have a ratio of a first x-ray diffraction peak intensity at a 2θ of about 12.5° and a second x-ray diffraction peak intensity at a 2θ of about 37.3° of 25% or less, 20% or less, 15% or less or 10% or less.

The battery material obtained after stabilization can be represented by the formula $K_yLi_xNi_zMO_2$, wherein x ranges from 0 to 0.2, y ranges from 0 to 0.3, z ranges from 0.1 to 1, and x+y ranges from about 0 to 0.5, and M is optional and can be one or more of Co, Mn, Al, Mg, Ti, Zr, Nb, Hf, V, Cr, Sn, Cu, Mo, W, Fe, Si, Zn, B, other transition metals, a rare earth element, or combinations thereof.

In one or more examples, x is 0.02 or more, 0.03 or more, 0.04 or more, 0.05 or more or 0.1 or more. In one or more examples, x is 0.2 or less, 0.15 or less, 0.10 or less, 0.07 or less or 0.05 or less. In one or more examples, y is 0.05 or more, 0.1 or more, or 0.15 or more. In one or more examples, y is 0.2 or less, 0.15 or less, or 0.1 or less. In one or more examples, z can be 0.1 or more, 0.15 or more, 0.2 or more, 0.25 or more, or 0.3 or more. In one or more examples, z can be 1 or less, 0.9 or less, 0.8 or less, 0.7 or less, or 0.5 or less.

In one or more examples, the battery material includes 0.5 weight % lithium or more by total weight of the battery material. In one or more examples, the battery material includes 0.5 weight % or more, 0.6 weight % or more, 0.75 weight % or more, 0.8 weight % or more, or 0.9 weight % or more lithium by total weight of the battery material. In one or more examples, the battery material includes 1.1 weight % lithium or less by total weight of the battery material. In one or more examples, the battery material includes 1.05 weight % or less, 1.0 weight % or less, 0.95 weight % or less, or 0.9 weight % or less lithium by total weight of the battery material.

In one or more examples, the battery material includes 50 weight % nickel or more by total weight of the battery material. In one or more examples, the battery material includes 55 weight % or more, 60 weight % or more, or 65 weight % or more nickel by total weight of the battery material. In one or more examples, the battery material includes 70 weight % nickel or less by total weight of the battery material. In one or more examples, the battery material includes 65 weight % or less, 60 weight % or less, or 55 weight % or less nickel by total weight of the battery material.

In one or more examples, the battery material includes 2 weight % potassium or more by total weight of the battery material. In one or more examples, the battery material includes 2.5 weight % or more, 3 weight % or more, or 4 weight % or more potassium by total weight of the battery material. In one or more examples, the battery material includes 6 weight % potassium or less by total weight of the battery material. In one or more examples, the battery material includes 5.5 weight % or less, 5 weight % or less, or 4 weight % or less potassium by total weight of the battery material.

The capacity of the battery material at 0.8V can be about 300 mAh/g to 400 mAh/g. For example, the capacity of the battery material at 0.8V can be 300 mAh/g or greater, 310 mAh/g or greater, 315 mAh/g or greater, 320 mAh/g or greater, 325 mAh/g or greater, 330 mAh/g or greater, 335 mAh/g or greater, 340 mAh/g or greater, or 350 mAh/g or greater, or any combination thereof. For example, the capacity of the battery material can be 400 mAh/g or less, 395 mAh/g or greater, 390 mAh/g or less, 385 mAh/g or less, 380 mAh/g or less, 375 mAh/g or less, 370 mAh/g or less, or 365 mAh/g or less.

The capacity of the battery material at 1.4V can be about 100 mAh/g to 300 mAh/g. For example, the capacity of the battery material at 1.4V can be 100 mAh/g or greater, 110 mAh/g or greater, 115 mAh/g or greater, 120 mAh/g or greater, 125 mAh/g or greater, 130 mAh/g or greater, 135 mAh/g or greater, 140 mAh/g or greater, or 150 mAh/g or greater, or any combination thereof. For example, the capacity of the battery material at 1.4V can be 300 mAh/g or less, 295 mAh/g or greater, 290 mAh/g or less, 285 mAh/g or less, 280 mAh/g or less, 275 mAh/g or less, 270 mAh/g or less, or 265 mAh/g or less.

The capacity of the battery material can be measured by including the battery material in a battery and measuring the capacity of the resulting battery. The battery can have an anode including zinc (e.g., fine zinc), zinc alloy, and/or zinc alloy particles. The battery can further include an alkaline electrolyte solution, and a separator. The cathode can further include the battery material of this disclosure. The cathode can further include between 2 wt % and 35 wt % (e.g., between 5 wt % and 20 wt %, between 3 wt % and 8 wt %, between 10 wt % and 15 wt %) conductive additive. The conductive additive can include graphite, carbon black, acetylene black, partially graphitized carbon black, silver powder, gold powder, nickel powder, carbon fibers, carbon nanofibers, carbon nanotubes, and graphene. The electrolyte can include lithium hydroxide, sodium hydroxide, and/or potassium hydroxide. The separator can be capable of preventing soluble oxide species from diffusing from the cathode to the anode or of trapping soluble oxide species. The capacity of the battery containing the battery material can be measured at 0.8V or at 1.4V by techniques known in the art.

The battery material can be in the form of a filter cake having a dried tap density, after drying, ranging from 1.5 $g/cm^3$ to 2.8 $g/cm^3$. The dried tap density of the battery material can be 1.5 $g/cm^3$ or more, 1.8 $g/cm^3$ or more, 1.9 $g/cm^3$ or more, 2.0 $g/cm^3$ or more, 2.05 $g/cm^3$ or more, 2.1 $g/cm^3$ or more, or 2.15 $g/cm^3$ or more. The dried tap density of the battery material can be 2.8 $g/cm^3$ or less, 2.5 $g/cm^3$ or less, 2.4 $g/cm^3$ or less, 2.3 $g/cm^3$ or less, 2.25 $g/cm^3$ or less, or 2.2 $g/cm^3$ or less. Suitable techniques for measuring the dried tap density include density can include 1) weighing a 250 mL graduate cylinder: M1; 2) filling KDLNO samples in the graduate cylinder below the 250 mL line; 3) weighing the graduate cylinder+KDLNO powders: M2, and the mass of the KDLNO powders is M3=M2−M1; 4) measuring the KDLNO volume in the graduate cylinder after 2500 taps in the Quantachrome auto tap analyzer: V1. The tap density can be calculated by M3 divided by V1.

Various aspects of the present invention are illustrated by the following non limiting examples. The examples are for illustrative purposes and are not a limitation on any practice of the present invention. It will be understood that variations and modifications can be made without departing from the spirit and scope of the invention.

EXAMPLES

In the following examples, a first intermediate product of a battery material obtained from a delithiation process can be treated by processes of this disclosure to reduce the amount of γ-NiOOH.

Examples 1 to 16

Add 1000 g deionized water to a baffled 1.0 L Ace Glass reactor 6441-38. Agitate at 800 rpm using a 50 mm diameter PTFE 45° 4-blade pitch blade turbine agitator with 3 cm of clearance from the inner vessel bottom. Heat to the desired temperature using a recirculating heater/chiller and hold at that temperature unit the end of the test. At the target temperature, add ~176.5 g of DLNO to the agitated solution. Add 15 wt. % HCl (aq.) or 7.5 wt. % $H_2SO_4$ (aq.) to the solution surface at the acid mol. (%) and (mol H+/mol DLNO) indicated in Table 1 for a treatment time of 2 hours. Filter the samples with Whatman 42 filter paper on a Buchner funnel at ~1 Bar vacuum. Wash with 1× the volume of DI-Water. Dry the acid treated solids in a shallow dish in the fume hood at ~20 C, <40% relative humidity for 16 hrs.

Comparative Example 1 was prepared according to the same method, but without addition of 15 wt. % HCl or 7.5 wt. % $H_2SO_4$.

The resulting solids were analyzed for yield, capacity, and XRD peak ratios. Results are presented in Table 1 below.

| | Temp. (° C.) | Acid Type | Acid Mol. (%) | (mol H+/mol DLNO) | Delithiation Yield (wt. %) | Capacity 0.8 V (mAh/g) | Capacity 1.4 V (mAh/g) | XRD 2θ = 12.5/37 (%) |
|---|---|---|---|---|---|---|---|---|
| C. Ex. 1 | — | none | none | none | 100.0 | 338.51 | 164.30 | 84.6 |
| 1 | 20 | HCl | 2.50 | 0.025 | 96.1 | 336.98 | 178.28 | 25.1 |
| 2 | 20 | HCl | 5.00 | 0.050 | 95.3 | 344.33 | 171.96 | 44.5 |
| 3 | 20 | HCl | 10.00 | 0.100 | 93.6 | 316.56 | 152.35 | 87.4 |
| 4 | 20 | HCl | 20.00 | 0.200 | 90.6 | 355.00 | 198.95 | 21.7 |
| 5 | 50 | HCl | 2.50 | 0.025 | 94.4 | 335.32 | 164.49 | 20.0 |
| 6 | 50 | HCl | 5.00 | 0.050 | 93.3 | 338.55 | 176.14 | 28.0 |
| 7 | 50 | HCl | 10.00 | 0.100 | 91.3 | 338.98 | 161.33 | 41.9 |
| 8 | 50 | HCl | 20.00 | 0.200 | 88.0 | 323.27 | 113.69 | 28.3 |
| 9 | 20 | $H_2SO_4$ | 1.75 | 0.025 | 95.3 | 339.04 | 172.05 | 29.2 |
| 10 | 20 | $H_2SO_4$ | 2.50 | 0.050 | 96.6 | 325.65 | 159.15 | 32.0 |
| 11 | 20 | $H_2SO_4$ | 5.00 | 0.100 | 89.8 | 338.55 | 164.76 | 27.5 |
| 12 | 20 | $H_2SO_4$ | 10.00 | 0.200 | 89.9 | 346.65 | 185.17 | 41.1 |
| 13 | 45 | $H_2SO_4$ | 1.75 | 0.025 | 94.9 | 326.09 | 151.57 | 28.0 |
| 14 | 45 | $H_2SO_4$ | 2.50 | 0.050 | 94.4 | 331.38 | 155.73 | 31.8 |
| 15 | 45 | $H_2SO_4$ | 5.00 | 0.100 | 90.3 | 354.70 | 166.48 | 48.7 |
| 16 | 45 | $H_2SO_4$ | 10.00 | 0.200 | 80.7 | 364.00 | 182.19 | 86.4 |

The present disclosure further relates to any one or more of the following numbered embodiments:

1. A process for producing a battery material, the process including contacting a first intermediate product of a battery material with an acidic medium under conditions sufficient to dissolve low-lithium-containing oxide present on a surface of the first intermediate product to obtain a second intermediate product, wherein a weight of the second intermediate product is from about 0.2% to about 5% less than a weight of the first intermediate product, and wherein the first intermediate product includes $Li_xNi_zO_2$, wherein x ranges from about 0 to about 0.2 and z ranges from about 0.1 and about 1.
2. The process to paragraph 1, wherein a weight of the second intermediate product is from about 1% to about 3% less than a weight of the first intermediate product.
3. The process of paragraphs 1 or 2, wherein the battery material after stabilization has a ratio of a first x-ray diffraction peak intensity at a 2θ of about 12.5° and a second x-ray diffraction peak intensity at a 2θ of about 37.3° of 50% or less after stabilization.
4. The process according to any of paragraphs 1 to 3, wherein the battery material after stabilization has a ratio of a first x-ray diffraction peak intensity at a 2θ of about 12.5° and a second x-ray diffraction peak intensity at a 2θ of about 37.3° of 25% or less after stabilization.
5. The process according to any of paragraphs 1 to 4, wherein the first intermediate product is $Li_xNi_zMO_2$, and wherein M is one or more of Co, Mn, Al, Mg, Ti, Zr, Nb, Hf, V, Cr, Sn, Cu, Mo, W, Fe, Si, Zn, B, or a rare earth element.

6. The process according to any of paragraphs 1 to 5, wherein the conditions of contacting the first intermediate product with an acidic medium include a ratio of mol H+/mol of the first intermediate product of from about 0.025 to about 0.2.

7. The process according to any of paragraphs 1 to 6, wherein the conditions of contacting the first intermediate product with an acidic medium include a ratio of mol H+/mol of the first intermediate product of about 0.07 or less.

8. The process according to any of paragraphs 1 to 7, wherein the conditions of contacting the first intermediate product with an acidic medium include a temperature in a range of about 20° C. to about 150° C.

9. The process according to any of paragraphs 1 to 8, wherein the conditions of contacting the first intermediate product with an acidic medium include a treatment time of up to about 3 hours.

10. The process according to any of paragraphs 1 to 9, wherein the first intermediate product is separated from an aqueous slurry including the first intermediate product and an acid prior to the contacting step.

11. The process according to any of paragraphs 1 to 10, wherein the acidic medium includes at least one of HCl, $H_2SO_4$, nitric acid, acetic acid, phosphoric acid, hydrobromic acid, hydroiodic acid, perchloric acid, chloric acid, or a combination thereof.

12. The process according to any of paragraphs 1 to 11, further including filtering the second intermediate product from the acidic medium using a membrane filter press with a gauge feed pressure ranging from about −0.5 bar to about 7 bar.

13. The process according to any of paragraphs 1 to 12, further including stabilizing the second intermediate product by contacting the second intermediate product with one or more of a Bronsted base optionally selected from Ba(OH)2, Ni(OH)2, CsOH, Sr(OH)2, RbO, NaOH, LiGH, KOH, $Ca(OH)_2$, or $Mg(OH)_2$, or a combination thereof to obtain the battery material.

14. The process according to any of paragraphs 1 to 13, wherein a yield of the battery material is greater than about 90%.

15. The process according to any of paragraphs 1 to 14, wherein the battery material is $K_yLi_xNi_zO_2$, wherein y ranges from about 0 to about 0.3, x ranges from about 0 to about 0.2, z ranges from about 0.1 to about 1, and x+y ranges from about 0 to about 0.5.

16. The process according to any of paragraphs 1 to 15, wherein the battery material includes from about 0.7 weight % to about 1.1 weight % lithium by total weight of the battery material, from about 50 weight % to about 70 weight % nickel by total weight of the battery material, and from about 2 weight % to about 6 weight % potassium by total weight of the battery material.

17. The process according to any of paragraphs 1 to 16, wherein the battery material has a dried tap density ranging from about 1.5 g/cm$^3$ to about 2.8 g/cm$^3$.

18. The process according to any of paragraphs 1 to 17, wherein the battery material has a capacity at 0.8V of from about 300 mAh/g to about 400 mAh/g.

19. The process according to any of paragraphs 1 to 18, wherein the battery material has a capacity at 1.4V of from about 100 mAh/g to about 300 mAh/g.

The forgoing description of particular aspect(s) is merely exemplary in nature and is in no way intended to limit the scope of the invention, its application, or uses, which can, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials can be interchangeable such that the description of the invention can include multiple parts or steps arranged in many ways as is readily appreciated by one of skill in the art.

It will be understood that, although the terms “first,” “second,” “third” etc. can be used herein to describe various elements, components, regions, and/or steps, these elements, components, regions, layers, and/or steps should not be limited by these terms. These terms are only used to distinguish one element, component, region, layer, or section from another element, component, region, layer, or section. Thus, “a first element,” “component,” “region,” “layer,” or “section” discussed above could be termed a second (or other) element, component, region, layer, or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. The term “or a combination thereof” means a combination including at least one of the foregoing elements.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits, and ranges appear in one or more claims below. All numerical values are “about” or “approximately” the indicated values, and take into account experimental error and variations that would be expected by a person having ordinary skill in the art.

Unless otherwise defined, all terms (including technical and scientific terms) used herein have the same meaning as commonly understood by one of ordinary skill in the art to which this disclosure belongs.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

What is claimed is:

1. A process for producing a battery material, the process comprising:

contacting a first intermediate product of a battery material with an acidic medium under conditions sufficient to dissolve low-lithium-containing oxide present on a surface of the first intermediate product to obtain a second intermediate product, wherein a weight of the second intermediate product is from about 0.2% to about 5% less than a weight of the first intermediate product, and wherein the first intermediate product comprises $Li_xNi_zO_2$, wherein x ranges from about 0 to about 0.2 and z ranges from about 0.1 to about 1.

2. The process according to claim 1, wherein a weight of the second intermediate product is from about 1% to about 3% less than a weight of the first intermediate product.

3. The process according to claim 1, wherein the battery material after stabilization has a ratio of a first x-ray diffraction peak intensity at a 2Θ of about 12.5° and a second x-ray diffraction peak intensity at a 2Θ of about 37.3° of 50% or less after stabilization.

4. The process according to claim 1, wherein the battery material after stabilization has a ratio of a first x-ray diffraction peak intensity at a 2Θ of about 12.5° and a second x-ray diffraction peak intensity at a 2Θ of about 37.3° of 25% or less after stabilization.

5. The process according to claim 1, wherein the first intermediate product is $Li_xNi_zMO_2$, and wherein M is one or more of Co, Mn, Al, Mg, Ti, Zr, Nb, Hf, V, Cr, Sn, Cu, Mo, W, Fe, Si, Zn, B, or a rare earth element.

6. The process according to claim 1, wherein the conditions of contacting the first intermediate product with an acidic medium comprise a ratio of mol H+/mol of the first intermediate product of from about 0.025 to about 0.2.

7. The process according to claim 1, wherein the conditions of contacting the first intermediate product with an acidic medium comprise a ratio of mol H+/mol of the first intermediate product of about 0.07 or less.

8. The process according to claim 1, wherein the conditions of contacting the first intermediate product with an acidic medium comprise a temperature in a range of about 20° C. to about 150° C.

9. The process according to claim 1, wherein the conditions of contacting the first intermediate product with an acidic medium comprise a treatment time of up to about 3 hours.

10. The process according to claim 1, wherein the first intermediate product is separated from an aqueous slurry comprising the first intermediate product and an acid prior to the contacting step.

11. The process according to claim 1, wherein the acidic medium comprises at least one of HCl, $H_2SO_4$, nitric acid, acetic acid, phosphoric acid, hydrobromic acid, hydroiodic acid, perchloric acid, chloric acid, or a combination thereof.

12. The process according to claim 1, further comprising filtering the second intermediate product from the acidic medium using a membrane filter press with a gauge feed pressure ranging from about −0.5 bar to about 7 bar.

13. The process according to claim 1, further comprising stabilizing the second intermediate product by contacting the second intermediate product with one or more of a Bronsted base optionally selected from Ba(OH)2, Ni(OH)2, CsOH, Sr(OH)2, RbO, NaOH, LiGH, KOH, $Ca(OH)_2$, or $Mg(OH)_2$, or a combination thereof, to obtain the battery material.

14. The process according to claim 13, wherein a yield of the battery material is greater than about 90%.

15. The process according to claim 13, wherein the battery material is $K_yLi_xNi_zO_2$, wherein y ranges from about 0 to about 0.3, x ranges from about 0 to about 0.2, z ranges from about 0.1 to about 1, and x+y ranges from about 0 to about 0.5.

16. The process according to claim 13, wherein the battery material comprises:

from about 0.7 weight % to about 1.1 weight % lithium by total weight of the battery material, from about 50 weight % to about 70 weight % nickel by total weight of the battery material, and from about 2 weight % to about 6 weight % potassium by total weight of the battery material.

17. The process according to claim 13, wherein the battery material has a tap density ranging from about 1.5 $g/cm^3$ to about 2.8 $g/cm^3$.

18. The process according to claim 13, wherein the battery material has a capacity at 0.8V of from about 300 mAh/g to about 400 mAh/g.

19. The process according to claim 13, wherein the battery material has a capacity at 1.4V of from about 100 mAh/g to about 300 mAh/g.

* * * * *